G. D. HARRIS.
APPARATUS FOR EVAPORATING MOISTURE CONTAINING MATERIALS.
APPLICATION FILED NOV. 11, 1915. RENEWED JULY 16, 1918.
1,296,509.
Patented Mar. 4, 1919.
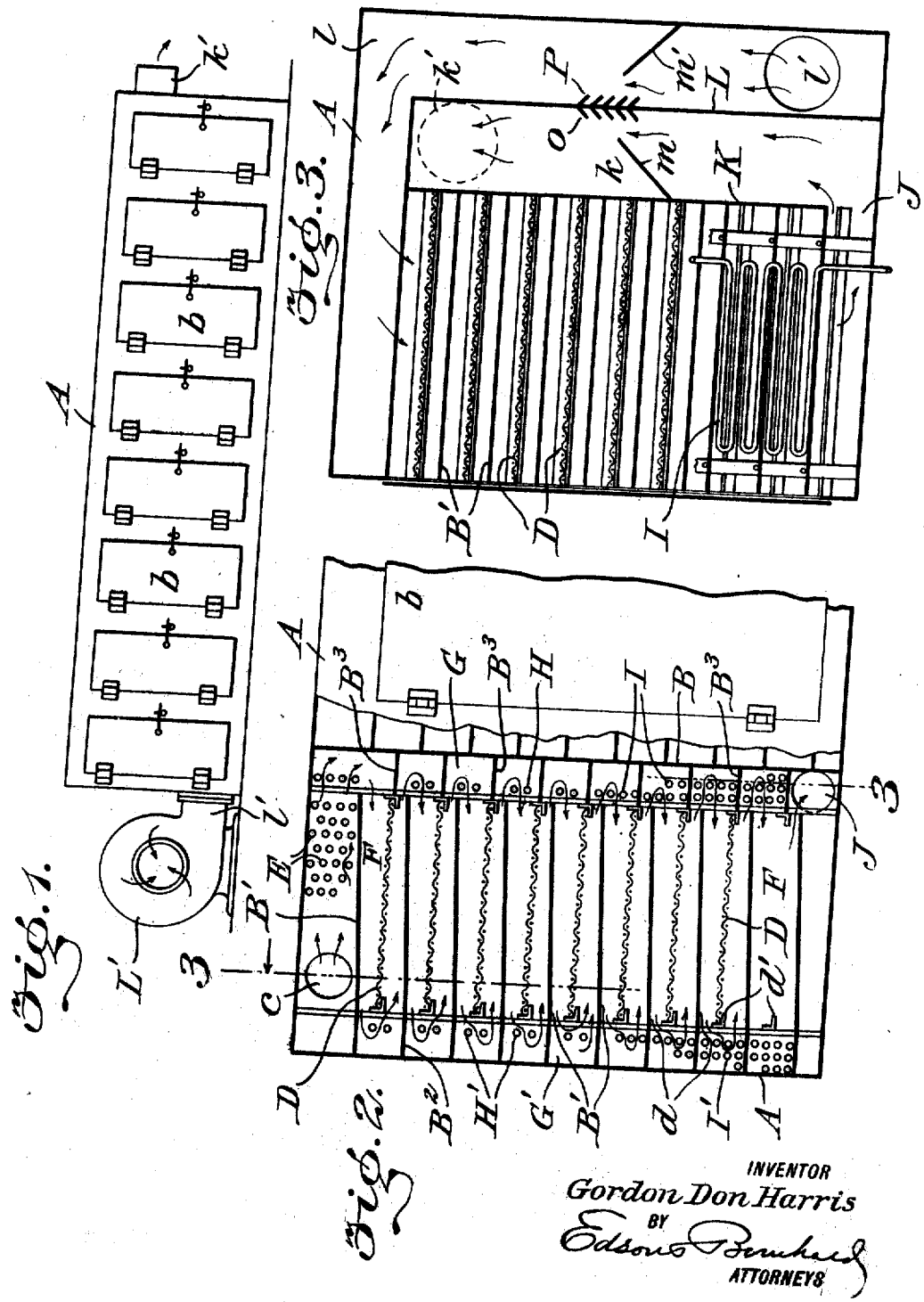
INVENTOR
Gordon Don Harris
BY
Edson Benham
ATTORNEYS

UNITED STATES PATENT OFFICE.

GORDON DON HARRIS, OF FREEPORT, NEW YORK.

APPARATUS FOR EVAPORATING MOISTURE-CONTAINING MATERIALS.

1,296,509.      Specification of Letters Patent.      Patented Mar. 4, 1919.

Continuation of application Serial No. 739,603, filed January 2, 1913. This application filed November 11, 1915, Serial No. 60,889. Renewed July 16, 1918. Serial No. 245,236.

*To all whom it may concern:*

Be it known that I, GORDON DON HARRIS, a citizen of the United States, residing at Freeport, in the county of Nassau, Long Island, and State of New York, have invented a certain new and useful Apparatus for Evaporating Moisture-Containing Materials, of which the following is a specification.

This invention is an evaporator for eliminating moisture from various materials, wherein a drying medium, such as air warmed to a suitable temperature, is utilized for eliminating moisture from the material under treatment, whereby efficiency and economy are obtained. Although it is preferred to employ air as the medium for carrying heat to the material under treatment, it is apparent that the direct heat from a furnace, or furnace gases, or boiler room gases, may be utilized as the evaporating agent, particularly in the treatment of materials containing a high percentage of moisture, such as peat, which material is not injuriously affected by high temperatures. Again, superheated steam may be employed as the evaporating agent, the same being particularly useful in the treatment of certain materials which require the utilization of both heat and moisture in the drying of the material, as in the case of the oxidation of the coatings applied to linoleums and similar sheet or web materials.

The apparatus of this invention is useful in drying many different kinds of materials, such as peat, various kinds of fertilizers such as humus and phosphates, paints or paint materials, such as white lead, linoleums and similar web or sheet-like moisture carrying materials, soap, and in fact any and all moisture containing substances.

As a drying medium, I may use air heated to a predetermined temperature, such drying medium when brought into contact with a moist material absorbing a certain percentage of moisture from such material, as a result of which the temperature of the drying medium is lowered to an appreciable or perceptible extent, it may be one degree or more, according to the temperature of the material under treatment and to the amount of moisture absorbed therefrom. To attain economy of operation, the present invention utilizes the drying medium repeatedly by bringing it into contact successively with layers of material, in contradistinction to some prior systems wherein air is circulated once only into contact with the material, i. e. by introducing warm air, conducting it over or through the material so as to absorb moisture therefrom, and immediately discharging the air.

The circulation of a warm or heated drying medium into contact successively with different layers of material to be dried reduces the temperature of such medium, for the reason that the evaporation of moisture cools it, and should this operation be carried on indefinitely, it follows that the medium will evaporate moisture to the point of saturation, thus resulting in a substantial decrease in the temperature of the drying medium, at which time the relatively cool and moisture saturated drying medium will practically lose its efficiency.

I overcome the foregoing objections, and attain the purposes of my invention, by heating a drying medium in the intervals between its contacts with the material under treatment, whereby said gaseous medium is maintained at a uniform temperature, notwithstanding its repeated contacts with the material, the drying medium being expanded in volume by the successive heating operations for the purpose of increasing its moisture evaporating capacity, whereby the drying medium is conditioned to render it suitable for repeated contacts with the material or until said medium shall have become saturated with moisture up to a certain point.

According to a preferred embodiment of this invention, a large volume of the drying medium is heated to a predetermined temperature, say 240° Fahrenheit, depending upon the nature of the material under treatment; this heating gaseous medium is conducted into contact (either directly or indirectly) with a layer of material, as a result of which it evaporates moisture and its temperature is lowered, say 1 degree, or to 239° Fahrenheit; the gaseous medium then flows into contact with a booster, such as a steam coil or other heater, by which said medium is reheated to the original temperature, 240° Fahrenheit, and thus expanded to render it capable of absorbing more moisture; the drying medium flows again into contact with a layer of material, thus absorbing more moisture and slightly cooling it, say again to 239° Fahrenheit; the gaseous medium is again boosted or reheated to restore it to the initial temperature and to expand it for the absorption of more moisture, and so on throughout the treatment, until said gaseous medium acquires a certain saturation of moisture. It is thus apparent that the drying medium is brought into contact with the successive layers of material, and that it is repeatedly heated and expanded for rendering it capable of absorbing moisture up to a certain point, whereby economy of steam is secured in the operations of heating and reheating the drying medium, as a result whereof rapidity and economy of evaporation is attained in eliminating moisture from the material under treatment.

The foregoing operations may be carried out in a single material-treating chamber, or in a series of such chambers.

It has long been known to those skilled in the art that in drying apparatus and evaporators of the ordinary kinds the layers of material adjacent to the point where heat is admitted are dried to an excessive degree, whereas other layers of material remote to the heat inlet are insufficiently dried, thus establishing inefficiency of operation and involving a wastage of energy, for the reason that the drying operation must be continued for such a length of time as to evaporate the material on the trays remote to the heat inlet, as a result of which the layers of material adjacent to the heat inlet became dried to an excessive degree and such material thereby is brought to what may be termed a burned condition. Again, in the drying or evaporating of any kinds of material the layers owing to excessive heating in the drying medium acquire a superficial coating or skin which to a material extent precludes the free transudation of moisture from the interior to the surface of the mass or the constituent parts thereof.

My invention overcomes the foregoing serious objections, for the reason that each layer of material is subjected to identical treatment by the drying medium the temperature of which is such as to effect the desired exchange of heat for moisture while at the same time the treatment leaves each mass of material in a condition for the free transudation of moisture from the interior of such mass, or the constituent parts thereof. The drying medium is heated to a temperature suited to the moisture content of the material, and as such moisture content varies in different materials it is apparent that the drying mediums for the treatment of such different materials will be heated to different temperatures; but in every case, the temperature of the drying medium will be so proportioned to the moisture content of the particular material to be treated, and the duration of the treatment will be such, that while the desired exchange of heat from the drying medium for moisture from the material will be effected, still the drying or evaporating operation will leave the material in the desired condition for the free transudation of moisture, each and every one of the layers of material throughout the series being subjected to identical treatment for the reason that the temperature of such drying medium is uniform throughout its flow into contact with the successive masses of material as a result of which the masses of material are thoroughly and uniformly dried in a rapid manner and by steam economically used under favorable conditions, each mass of material being free from a superficial coating upon the exterior of the mass or upon the constituent parts thereof so that the moisture content is free to transude from the mass under the conditions of treatment secured by this invention.

Other features of the invention, and the advantages thereof, will appear from the following detailed description, taken in connection with the accompanying drawings, wherein—

Figure 1 is an elevation of a drier embodying this invention.

Fig. 2 is a vertical section taken in the direction of the length of the apparatus, illustrating one of the material treating chambers and a series of trays therein, together with the boosters or heaters associated with said material-treating chamber for boosting the temperature of the moisture carrying medium in the intervals between its contacts with the material on said trays.

Fig. 3 is a vertical section in the plane of dotted line 3—3 of Fig. 2.

A designates a casing the interior of which is divided longitudinally and transversely, as will hereinafter appear, for the purpose of producing a series of material-treating chambers. Combined with said casing is a flue into which a drying medium, such as atmospheric air, is admitted for the purpose of preheating the air prior to its admission to said material-treating chambers, and a separate flue into which warm air from the material-treating chambers is discharged in such a manner that the heat of the outflowing warm air is utilized to advantage for preheating the inflowing air.

Casing A is divided transversely by vertical partitions B into the series of material-treating chambers, access to which chambers is obtainable by doors $b$ provided in the front of said casing.

Each material-treating chamber is divided by substantially horizontal partitions B' B² into a series of compartments and a series of heating or boosting chambers, but, as the construction of each material-treating chamber is the same throughout the apparatus, a description of one of said chambers will answer equally for the others. At the top of each material-treating chamber, partition B' and the top wall of the casing forms a chamber C, into which the drying medium flows through a suitable inlet c, said chamber C containing means for warming the air to a temperature suitable for the treatment of the material which is contained on trays D, supported within the compartments of the chamber. The means for heating the air to the required temperature just prior to flowing into contact with the material is shown as a heater comprising live steam coils E, said coils being of such capacity and number that the air, preheated or otherwise when admitted by inlet c into chamber C, will as said air flows into contact with coils E, be raised to a temperature suitable for treating said material.

Partitions B' B² are positioned alternately with respect to each other and within the material-treating chamber, for the purpose of producing a series of compartments F, said partitions extending from one wall of the chamber nearly to the other wall thereof. Within these compartments are provided angle irons d for supporting foraminous trays D, or their equivalents, whereby the material is supported in layers within said compartments F for the drying medium to circulate over and beneath the material on said trays. In each compartment the angle irons d are positioned to sustain trays D intermediate the substantially horizontal partitions B' B², in order that the drying medium may flow above and below the material on the trays.

Each tray D is positioned between two partitions, so as to form therewith two passages, one above the tray and the other below said tray, so that the drying medium will flow in a circuitous or zig-zag path through each compartment. Furthermore, the tray and the two partitions adjacent thereto are relatively arranged to secure tapering passages, the intake ends of which are larger than the outlet ends; as shown in Fig. 2, the tray is horizontal, the upper partition is inclined in one direction with respect to the tray, so as to produce a passage which tapers in one direction, whereas the lower partition is inclined in an opposite direction with respect to the tray so that the lower air passage tapers in the opposite direction. The passages above and below the tray open into the heating chambers, so that the drying medium flows from above the tray into one heating chamber, thence below the tray into the next heating chamber, and so on through the compartments successively and through the heating chambers in like order.

The purpose of inclining the partitions relatively to the trays so as to produce the tapering passages is to retard the flow of the drying medium through said passages and while in contact with the masses of material upon the trays. By thus checking or throttling the flow of the drying medium while in contact with the material, said medium is controlled or put under compression while circulating through the compartments, and as a result the drying medium is directed against, and into intimate contact with, the masses of material, on both the top and bottom surfaces thereof, such intimate contact of the drying medium with said surfaces of the material securing increased efficiency in the operation of evaporating moisture from each layer or mass of material.

According to my invention, the direction of flow of the gaseous current is reversed immediately following its interval of contact with the material and prior to the next contact with such material, and at or during this period of reversal in the direction of flow, the drying medium is conditioned so as to render it capable of evaporating more moisture or, in other words, to substantially increase its moisture absorbing capacity. This operation of bringing the drying medium to a condition of increased moisture-absorbing capacity at the period of reversing the direction of flow, is effected within the heating chamber which connects two adjacent air passages, such operation being brought about by the action of the booster or reheater positioned within said chamber. The drying medium flowing out of one passage, and bearing a certain proportion of moisture, is brought immediately into contact with the surfaces of the booster or reheater, as a result of which the said medium is expanded and agitated so as to diffuse the moisture through, and mix it uniformly with, the gaseous drying medium, which diffusion of moisture, when taken in connection with the step of reheating the drying medium so as to restore the temperature (lost by the previous evaporation of moisture), brings the drying medium into a superior moisture absorbing condition prior to said medium flowing again into contact with the material. These operations of restoring the drying medium to a proper condition for absorbing moisture take place between the contacts of said medium with the upper surface and the under surface, respectively, of each mass of material, and, also, between the contacts of said medium with the successive masses.

As shown in the drawings, the drying medium is admitted at the top of the treating chamber and flows back and forth therein, or in a circuitous path, in a generally downward direction and toward the exit positioned at the bottom of said chamber; but it is apparent that the general direction of flow may, if desired, be reversed by conducting the drying medium generally in an upward direction.

It will be noted by reference to Fig. 2 that the horizontal partitions B' B² extend from one wall nearly to the other, and that in the space between the short end of the partitions and said other wall is a series of short horizontal partitions B³, the latter being substantially in the horizontal plane of trays D. The trays do not extend the full length of the horizontal compartments F. The partitions B' B² B³ and the trays are so related, that heating or boosting chambers G G' are provided at the respective ends of the tray-containing compartment. A suitable number of these tray-containing compartments are provided with boosters or heaters H H', the same being adapted to utilize live steam as the medium for heating the air, but below these steam boosters or heaters H H', it is preferred to employ other boosters or heaters I I' through which hot water is adapted to circulate. The convolutions of the hot water coils I I' increase in number in the successive coils, that is to say, after the drying medium flows out of the compartments containing the live steam coils, it is brought into contact with one hot water coil I having four convolutions, the next hot water coil I' contains five convolutions, and as the air flows into contact with the succeeding coils the convolutions of said coils increase in number.

A salient feature of this invention is the employment of means for boosting or reheating the drying medium each time it flows into contact with the material on the trays, and in the embodiment shown, the boosting or reheating means consists of steam coils H H' and hot water coils I I', two of said coils being positioned at the respective ends of each tray, so that as the drying medium flows over one tray it is brought into contact with one coil, it then flows beneath the tray and is brought into contact with another coil by which it is boosted or reheated before it flows over the next tray, and so on throughout the series of compartments F within the material-treating chamber.

In my apparatus the drying medium admitted to chamber C and brought into contact with the heating coil E, is conducted in a circuitous path and into repeated contacts with the material resting upon the trays D of all the compartments within the material-treating chamber, said drying medium flowing back and forth, over and beneath the trays, and from one compartment into the other, whereby the entire volume of the drying medium supplied continuously to each chamber is conducted successively into contact with the separated layers of material. The drying medium when first admitted is raised to a temperature suitable for treating the particular material loaded upon the trays, and as it flows over the material upon the first tray its temperature is slightly decreased, owing to the fact that the drying medium gives off some of its heat and absorbs moisture from the material; but said drying medium is immediately brought into contact with the booster or heater H', by which it is restored to the initial temperature as it flows beneath the first tray. After passing below the first tray, the drying medium flows into chamber G and into contact with the booster coil H therein, by which it is again restored to its initial temperature before it flows over the second tray, whereupon the drying medium flows through chamber G' and into contact with the booster or coil H' so that it is reheated before it flows below the second tray. These operations of conducting the drying medium over and beneath the trays, and into contact with the boosters or heating coils before it passes into the succeeding compartments, are repeated throughout the several compartments of each material-treating chamber, and finally the drying medium flows out by an outlet J.

The employment of the boosters or heating coils H H' I', at the respective ends of the trays, or in the chambers at the ends of the tray-containing compartments, provides efficient means for keeping the drying medium at a normal or predetermined temperature in order to obtain efficiency in the evaporation of moisture from the material, but a marked feature of the invention is the very great economy of fuel required for heating or boosting the drying medium. As hereinbefore stated, the drying medium is preheated prior to its admission to the material-treating chambers. It is brought up to the temperature required by contact with heater E; any slight decrease in the temperature due to the contact of said medium with the material will result in the medium being brought back to a standard temperature by contact with one or more of the boosters or coils H H' I I', and thus, while the medium is used repeatedly by contact with the successive layers of material, the temperature of said medium is maintained at a predetermined standard by the boosters or coils, as a result of which no very great expenditure of fuel is necessary to maintain the drying medium at the predetermined temperature, and very great efficiency and economy is thus obtained, for the reason that the drying medium when heated at this temperature will be expanded in volume and have a capacity for absorbing moisture from the material under treatment without, however bringing the heated drying medium to a condition wherein it will be saturated with moisture or placing it in such a condition as will result in the deposition of moisture upon the material.

The apparatus herein shown is constructed with a preheater of a particular form. Extending longitudinally of the casing, at the rear of the material-treating chambers therein, are vertical parallel partitions K L which produce an outlet flue or chamber $k$ and an inlet flue or chamber $l$. The exits from the material-treating chambers open into exit chambers $k$, whence the moisture-laden air flows through an exit $k'$ adapted to discharge into a stack or uptake, or at any other suitable place. The air is blown into chamber $l$ by a fan L' having a connection $l'$ with said chamber $l$, and with this chamber $l$ communicates the openings $c$ of heating chambers C, whereby the air preheated in chamber $l$ is free to flow through openings $c$ into the series of chambers C at the upper ends of the material-treating chambers.

The chamber $k$ is positioned between the material-treating chambers and the air pre-heating chamber $l$, and in the apparatus shown the heat present in the air flowing out of the material-treating chambers is utilized for preliminarily heating the inflowing air which circulates through chamber $l$. To this end, baffles $m$ $m'$ are positioned within chambers $k$ $l$, respectively, and heat-transmitting baffles $o$ $p$ are provided on the partition L, and within the respective chambers $k$ $l$. Preferably, the partition L and baffles $o$ $p$ are composed of a metal sensitive to the action of heat, such as copper. The warm air from the material-treating chambers flows into exit chamber $k$, and into contact with copper partition L and copper baffles $o$, the warm air being directed towards parts L $o$ by one or more baffles $m$. The air is thus brought into contact with the parts L $o$ for the purpose of giving off its heat to these parts, whereby the heat will be carried by partitions L into chamber $l$. The air flowing into the chamber through inlet $l'$ is brought into contact with the partition L and baffles $p$, the inflowing air being directed toward the baffles $p$ by one or more baffles $m'$. As a result, the inflowing air is preliminarily heated before its admission to chamber C, and the heat contained in the outflowing air is utilized for preheating the inflowing air.

The foregoing description sets forth with particularity one type of preheater, the same being positioned rearwardly of the material-treating chambers. Obviously, other forms of preheaters may be employed for the drying medium, and, further, said preheater may be positioned at any suitable point relatively to the treating chamber or chambers.

The operation will be apparent from the foregoing description, but may be summarized as follows:

The material is loaded upon the foraminous trays D, and the doors $b$ to the material-treating chambers being open, the filled trays are placed upon the angle irons $d$, for supporting the trays and the material within the compartments F. The blower circulates air through the preheater and the chambers C, the outflowing air passing through exits J into the preheater and thence through exit $k'$. As the air flows into the preheater, it is heated by the warm air flowing out of the preheater, and as the air flows through chambers C and into contact with coils E, such inflowing air is heated to the temperature required, say to 240° Fahrenheit. The air flows back and forth through each compartment F, and successively from one compartment into the other. The contact of the air with the material upon the trays results in the absorption of a certain amount of moisture from such material, so that the temperature is slightly lowered, but before the air is brought into contact again with the material it flows into contact with one or the other of the boosters or heaters, by which the temperature is slightly raised so as to restore to the air the heat lost by the absorption of moisture, whereby the temperature of the air is maintained at a predetermined standard, notwithstanding the loss of heat and absorption of moisture due to contact with the material. The air is used repeatedly and is heated in the intervals between its contacts with the material, thus resulting in economy and efficiency of operation, but the heat present in the outflowing air, after such air leaves the material-treating chambers, is utilized in the preheater for the purpose of preheating the inflowing air.

It is evident that various changes in the structure may be employed. In the drawings I have shown each material-treating chamber as being separate from, and independent of, the other material-treating chambers, but it may be desired to circulate the air from one chamber into the other chamber, as for example when it is desired to evaporate moisture from a material which is slow to give off its moisture. Furthermore, the means for supporting the material within the compartments of each treating chamber may be modified, in which case the trays may be dispensed with, and suitable endless belts or aprons employed for imparting movement to the material while treating it. Furthermore, dampers or valves may be placed at various points for controlling the circulation of air, but as all these features are well known to those skilled in the art, I have not considered it necessary to illustrate the same in detail.

It should be stated that the temperature of the drying medium when admitted to the chambers will be such as is best calculated to evaporate moisture from the particular material under treatement. Thus, in treating material which will readily give off moisture, the drying medium is heated to a temperature most suitable for successful evaporation. Other materials which are slow to give off moisture owing to the physical condition of such material, will require a drying medium the temperature of which varies within wide limits, but in all instances the means for boosting or reheating the drying medium operates to maintain it substantially at a predetermined temperature, for the reason that the loss in temperature due to the contacts of said medium with the material will be offset by the action of the boosting or reheating coils, the drying medium being conducted into direct contact therewith as it circulates successively through the chambers. Furthermore, it will be noted that the partitions and the material-supporting devices are inclined relatively to each other, in order that the drying medium will flow through tapering spaces above and below the trays, whereby the drying medium flowing above the tray is directed against, and into intimate contact with, the material on such tray; and as said drying medium flows below the tray, it will likewise be conducted into intimate contact with the material thereon. The drying medium thus circulates in a manner to have a direct and intimate contact with the material which is supported in separated layers within the several compartments, the large volume of air supplied by the blower being preheated, used continuously and repeatedly in direct contact with the material, and reheated at frequent intervals so as to maintain the air substantially at the predetermined temperature, and in an efficient moisture-absorbing condition.

The moisture-laden air from the material-treating chambers (one or more) flows under pressure into an exit chamber $k$ of the preheater, and by reason of such pressure the air is circulated through said chamber $k$ and discharged through exit $k'$. During such outflow of the warm air, it is chilled, in a measure, by parting with its heat in order to preheat the air flowing onto the preheater, but should it become necessary, an exhauster may be used at the outlet $k'$ for discharging the moisture-laden chilled air.

The present application is a continuation of and includes matter presented in my prior application Serial No. 739,603. The process herein disclosed of treating moisture-containing materials forms the subject matter of a divisional application Serial No. 60,890.

Having thus fully described the invention what I claim as new and desire to secure by Letters Patent is:—

1. In an evaporator, the combination of a series of compartments, means positioned therein for supporting material in separated masses, one mass in each compartment, means for heating a drying medium to a predetermined temperature, means for circulating such drying medium back and forth above and below the material within each compartment and successively through the series of compartments, and means for reheating the drying medium to the predetermined temperature as it flows from one compartment into the next and also for reheating the drying medium in the interval between the contacts of such drying medium with the upper and under surfaces of the mass of material in each compartment.

2. In an evaporator, a treating chamber, means for supporting material in separated masses therein, means for heating a drying medium to a predetermined temperature, means for circulating said drying medium back and forth above and below the material, means opposing the flow of the drying medium in presence of each mass of material and while in contact with the upper and under surfaces of such mass, and reheaters positioned for the drying medium to flow into contact therewith so as to reheat the drying medium in the intervals between its contacts with the successive masses and with the upper and under surfaces of each mass.

3. In an evaporator, the combination of a series of compartments, means for supporting material to be treated in separated masses respectively in each compartment, means for preheating a drying medium to a desired temperature, means for circulating such a drying medium within the compartments and successively through them, and reheaters in the path of the drying medium for reheating said drying medium so as to maintain it at the predetermined temperature, in the intervals between its contacts with the successive masses, the walls of said compartments being positioned with reference to the material-supporting means so as to oppose or retard the flow of the drying medium while in the presence of the masses of material and to thereby secure an intimate contact of the drying medium with such material.

4. In an evaporator, a treating chamber, partitions separating the chamber into compartments, other partitions dividing the chamber into heating passages, material-holding trays located in each compartment and extending longitudinally of the same and dividing each compartment into two passages, means for circulating a drying medium and forcing it through the heating passages and through the passages formed by the trays, means for heating the incoming drying medium at such predetermined temperature, as it flows into contact with the material under treatment.

5. In an evaporator, a treating chamber, partitions dividing said chamber into a series of heating passages, other partitions dividing the chamber into a series of material-holding compartments, material-holding means supported in each compartment and dividing the same into two passageways so arranged in relation to each other that the exit end of each passageway is smaller than the entrance end thereof, the said passageways communicating with the heating passages, means for supplying a drying medium to the treating chamber, means for heating the drying medium, as it is supplied to the chamber, to a predetermined temperature, and means within the heating passages to maintain the drying medium at a predetermined temperature during its contacts with the successive masses of material.

6. In an evaporator, a treating chamber, partitions for dividing said chamber into a series of material-treating compartments and into a series of heating passageways, material-supporting means for holding the material in separated masses, one mass in each material-treating compartment, said partitions and the material-supporting means being arranged with respect to each other to produce tapering passages the exit ends of which are smaller than their intake ends, means for circulating a drying medium through said heating passageways and through the tapering passages so that within the latter the flow of the drying medium is retarded and directed against and into contact with the masses of material and means for reheating the drying medium during its circulation, said reheating means being positioned within the heating passageways.

7. In an evaporator, a treating chamber, partitions for dividing the chamber into a series of compartments, material-holding means within said compartments, said partitions and the material-holding means being relatively arranged to produce tapering passages extending respectively above and below the material-holding means, means for circulating a drying medium through the treating chamber, the flow of such drying medium through the tapering passages being retarded so as to result in the drying medium being directed against and into contact with the material, means for heating the drying medium to a desired temperature prior to its circulation, and means for reheating the drying medium during its circulation so as to maintain it substantially at a predetermined temperature.

8. In an evaporator, a treating chamber, partitions arranged to divide said chamber into a series of material compartments and two series of heating passageways, material-supporting means within said material compartments, means for initially heating a drying medium, means for circulating the drying medium through said material compartments and the heating passageways, the relation of the material supporting means to the walls of the compartments being such as to throttle the flow of the drying medium within said compartments and in the presence of the material therein, the direction of flow of the drying medium being reversed by and within said passageways, and means within the passageways for reheating the drying medium during such reversal in the direction of flow, whereby the drying medium is maintained at a predetermined temperature.

9. In an evaporator, a treating chamber, means for supporting material in separated masses therein, means for heating a drying medium to a predetermined temperature, means for circulating the drying medium into contact with the separated masses of material, means for throttling the flow of the drying medium in the presence of each mass of material, means for reversing the direction of flow of the drying medium subsequent to its contact with each mass of material, and means for reheating the drying medium at the time of reversing its direction of flow so as to maintain the drying medium at the predetermined temperature.

10. In an evaporator, the combination with a series of compartments, and means for supporting material therein, of means for circulating a drying medium back and forth within each compartment and successively through the compartments of the series, whereby the drying medium is brought into contact repeatedly with said material, and reheaters in coöperative relation to said compartments for the drying medium to flow into contact therewith.

11. In an evaporator, the combination with a series of compartments and means for supporting material therein, of means for circulating a drying medium back and forth within each compartment and successively from one compartment to the next, the walls of said compartments opposing the flow of said drying medium while in contact with the upper and under surfaces of the material in each compartment, means for initially heating the drying medium to a predetermined temperature, and means for reheating the drying medium while circulating it through the compartments.

12. In an evaporator, a series of compartments, means for supporting material therein, means for circulating a drying medium back and forth through each compartment and successively through the compartments so that the drying medium will flow into contact with the upper and under surfaces of the material, and reheaters positioned in the path of the drying medium circulating through the compartments.

13. In an evaporator, the combination with a series of compartments, and means for supporting material therein, of means for supplying a drying medium to, and circulating it through, the compartments and repeatedly into contact with the material, live steam coils in coöperative relation to certain of said compartments, and hot water coils in coöperative relation to other of said compartments, the live steam coils being nearer than the hot water coils to the inlet point of the drying medium and all of said coils being in the path of flow of the drying medium.

14. In an evaporator, the combination of a series of compartments, means for supporting material therein, means for circulating a drying medium back and forth through each compartment and above and below such material-supporting means, and reheaters positioned in the path of the drying medium.

15. In an apparatus of the class described, the combination with a chamber, means for supporting therein material in separated masses, and means for circulating a drying medium within said chamber, of means for reversing the direction of flow of said drying medium whereby it is caused to flow into repeated contact with said masses of material, and means for reheating said drying medium, said reheating means being positioned adjacent to the points at which occur the reversal in the direction of flow of said drying medium.

16. In an apparatus of the class described, the combination with a main chamber, and means for supporting therein material in separated masses, of means separate from the material-supporting means and positioned for dividing said main chamber into a series of material chambers and into a series of heater chambers, said heater chambers being positioned at the ends of said material chambers and each heater chamber being in communication with two of said material chambers, means for circulating a drying medium within the material chambers and the heater chambers, and means positioned within the heater chambers and in the path of the drying medium circulating therethrough for reheating said drying medium in the intervals between its contacts with the successive masses of material, whereby the drying medium throughout its flow into successive contacts with the separated masses is kept at a temperature which leaves each mass in a condition for the free transudation of moisture while the contact of said medium with the mass is effective in exchanging heat for moisture.

17. In an apparatus of the class described, the combination with a main chamber, and means for supporting therein material in separated masses, of dividing means separate from the material-supporting means, said dividing means being positioned within said main chamber for producing therein a series of material chambers and a series of heater chambers, means for circulating air within said material chambers and said heater chambers, said dividing means operating to isolate said masses of material and to direct the drying medium into contact with said masses, and reheaters positioned within the heater chambers for reheating the drying medium in the interval between its contacts with said masses of material, whereby the drying medium throughout its flow into successive contacts with the separated masses is kept at a temperature which leaves each mass in a condition for the free transudation of moisture while the contact of said medium with the mass is effective in exchanging heat for moisture.

18. In an apparatus of the class described, the combination with a main chamber, and means for supporting therein material in separated masses, of dividing means separate from said material-supporting means, said dividing means being within the main chamber and positioned to subdivide the same into a series of material chambers and a series of heater chambers, means for circulating air within said material chambers and said heater chambers, said dividing means serving to isolate said masses of material and operating to direct the flow of the drying medium in a back and forth direction through the main chamber and successively throughout the material chambers and the heater chambers, means for preheating said drying medium to a desired temperature, and means positioned within the heater chambers and in the path of the drying medium for maintaining the latter throughout its flow into successive contact with the separated masses at a temperature which leaves each mass in a transudatory condition while the contact of said medium with said masses is effective in exchanging heat for moisture.

19. In an apparatus of the class described, the combination with a main chamber, and means for supporting therein material in separated masses, of dividing means separate from said material-supporting means, said dividing means being contained within the main chamber and subdividing the latter into a series of compartments adapted for containing the material-supporting means, means for circulating a drying medium, said dividing means serving to isolate said masses of material and operating to direct said drying medium in a back and forth direction within the main chamber and successively through the material-containing compartments therein, and reheaters positioned in operative relation to the material-containing compartments and in the path of the drying medium so as to contact therewith at the points at which occur the changes in the direction of flow of the drying medium whereby said drying medium is maintained in a condition to leave all the masses of material in a transudatory condition while securing the desired exchange of heat for moisture.

20. In an apparatus of the class described, the combination with a main chamber, and means for supporting therein material in separated masses, of dividing means separate from the material-supporting means, said dividing means being positioned within the main chamber and subdividing the latter into a series of compartments adapted for containing the material-supporting means, means for circulating a drying medium, said dividing means serving to isolate said masses of material and operating to direct the flow of the drying medium through the compartments successively and into contact with the masses therein, and means positioned in the intervals between said material-containing chambers for conditioning said drying medium so that the contacts of said medium with the successive masses exchanges heat for moisture and leaves each mass in a transudatory condition.

21. In an apparatus of the class described, the combination with a main chamber, and means for supporting therein material in separated masses, of dividing means separate from said material-supporting means, said dividing means being positioned within the main chamber and sub-dividing the latter into a series of compartments adapted for containing the material-supporting means, means for circulating air, means for preheating air to a desired temperature, said dividing means serving to isolate said masses of material and to direct the flow of the preheated air through the successive compartments and into contact with the material therein, and means positioned adjacent the material-supporting means for reheating the air in the intervals between its contacts with the masses and to thereby condition the air throughout its flow so as to render the same effective when in contact with the masses for exchanging heat for moisture and to leave each mass in a transudatory condition.

22. In an apparatus of the class described, the combination with a main chamber, and means for supporting material in separated masses therein, of dividing means positioned for sub-dividing said main chamber into a series of compartments adapted for containing said material-supporting means, means for circulating air, means for preheating air, said dividing means serving to isolate said masses of material and to direct the flow of the preheated air successively through said compartments and into contact with the masses therein, and reheaters positioned in the path of flow of the air and intermediate the material-supporting means for conditioning the air throughout its flow into successive contacts with the masses of material.

23. In an apparatus of the class described, the combination with a main chamber and means for supporting therein material in separated masses, of dividing means positioned for sub-dividing said chamber into a series of compartments arranged one below the other and adapted for containing said material-supporting means, means for circulating air, means for preheating air to a predetermined temperature, said dividing means serving to isolate said masses of material within said compartments and to direct the flow of the preheated air in a back and forth direction through the main chamber and successively through the compartments therein and into contact with the masses within said compartments, and reheaters operating during circulation of the air for conditioning the latter and maintaining unimpaired its capacity for exchanging heat for moisture while leaving the masses of material in a condition for the free transudation of moisture therefrom.

24. In an apparatus of the class described, the combination with a main chamber, and means for supporting therein material in separated masses, of dividing means separate from the material-supporting means, said dividing means being contained within the main chamber and subdividing the latter into a series of compartments adapted for containing the material-supporting means, means for circulating a drying medium, said dividing means serving to isolate said masses of material and to direct the flow of the drying medium successively through said compartments and into contact with the masses therein, means for preheating said drying medium to a desired temperature, and means positioned in the path of the drying medium and in the intervals between its contacts with the successive masses for maintaining said drying medium at a temperature which leaves each mass of material in a transudatory condition while the contact of said medium with the masses is effective in exchanging heat for moisture.

25. An apparatus for evaporating moisture-containing materials comprising a main chamber, division walls positioned within said chamber for dividing the latter into a plurality of compartments, means for circulating a gaseous drying medium, means for supporting material in separated masses within said compartments, said division walls being positioned for directing the drying medium through the compartments successively of said chamber, and boosters positioned adjacent said compartments, each booster being common to two of said compartments and arranged in the line of flow of the gaseous drying medium as the latter circulates from one compartment to the next compartment.

26. An apparatus for evaporating moisture-containing materials embodying a series of division walls relatively arranged to produce a succession of material chambers, means for supporting material in separated masses within said chambers, means for circulating a gaseous drying medium through the first chamber and successively through the other chambers of the series, said division walls operating to isolate the masses of material and to direct the flow of the drying medium into and through said chambers, and boosters in the line of flow of the drying medium, one of said boosters being positioned adjacent the exit from each chamber and the inlet to the next succeeding chamber for reheating the air to maintain the same at a constant temperature.

27. An apparatus for evaporating moisture-containing materials embodying a series of division walls relatively arranged to produce a succession of material chambers, means for supporting material in separated masses within said chambers, means for feeding a gaseous drying medium to the first chamber and for circulating said drying medium successively through the remainder of said chambers, certain of said division walls being substantially parallel to the planes of the material supporting means and said walls operating to direct the flow of the drying medium through said chambers successively, and two series of boosters in the line of flow of the drying medium, one of said boosters being positioned adjacent the exit from each chamber and the inlet to the next succeeding chamber for reheating the air so as to maintain the temperature constant.

28. An apparatus for evaporating moisture-containing materials embodying a series of division walls relatively arranged for producing a series of material chambers, means for supporting material within said chambers, means for feeding a gaseous drying medium to the first chamber and for circulating said medium from the first chamber successively through the remaining chambers of the series, certain of said division walls operating to isolate the masses of material and said division walls directing the flow of the drying medium through the chambers successively, and two series of boosters in the line of flow of the drying medium, one of said boosters being positioned adjacent the exit from each chamber and the inlet to the next chamber of the series for reheating the air to maintain the temperature constant.

29. In an evaporator, a chamber, division walls positioned for producing a succession of flow channels within said chamber, means for supporting material in separate masses within said flow channels, means for feeding a gaseous drying medium to the first flow channel and for circulating said medium through the successive flow channels, and boosters positioned in the line of flow of the drying medium, there being one booster adjacent the exit from each flow channel and the inlet to the next flow channel, whereby the boosters reheat the air for maintaining its temperature constant during the circulation into repeated contacts with the masses of material.

In testimony whereof, I have hereunto subscribed my name.

GORDON DON HARRIS.